United States Patent [19]

Iwanami et al.

[11] Patent Number: 4,704,423

[45] Date of Patent: Nov. 3, 1987

[54] PROCESS FOR PRODUCING MOLDED ARTICLE COMPRISING HYDROTALCITE, EVOH, AND OLEFIN RESIN

[75] Inventors: Teruo Iwanami, Ibaraki; Takamasa Moriyama, Suita, both of Japan

[73] Assignee: Nippon Gohsei Kagaku Kogyo Kabushiki Kaisha, Osaka, Japan

[21] Appl. No.: 861,401

[22] Filed: May 9, 1986

[30] Foreign Application Priority Data

Feb. 3, 1986 [JP] Japan .................................. 61-21706

[51] Int. Cl.$^4$ ............................ C08K 3/10; C08K 3/22
[52] U.S. Cl. ..................................... 524/417; 524/424; 524/503
[58] Field of Search ......................... 524/417, 424, 503

[56] References Cited

U.S. PATENT DOCUMENTS

| | | | |
|---|---|---|---|
| 4,085,088 | 4/1978 | Miyata et al. | 523/205 |
| 4,251,430 | 2/1981 | Kennedy-Skipton et al. | 523/514 |
| 4,433,073 | 2/1984 | Sano et al. | 524/856 |
| 4,613,644 | 9/1986 | Moritani et al. | 524/417 |

FOREIGN PATENT DOCUMENTS 0139931 5/1985 European Pat. Off. .
0165383 12/1985 European Pat. Off. .

Primary Examiner—Herbert J. Lilling
Attorney, Agent, or Firm—Antonelli, Terry & Wands

[57] ABSTRACT

A process for producing a molded article comprising a mixture of an olefin resin, which includes a residual chlorine due to a Ziegler type catalyst, a hydrolyzed ethylene-vinyl acetate copolymer and the hydrotalcite compounds having the formula:

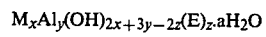

(wherein "M" is Mg, Ca or Zn, "E" is $CO_3$ or $HPO_4$, "x", "y" and "z" are positive numbers and "a" is 0 or a positive number). The hydrotalcite is previously melt-mixed into the olefin resin in a proportion of 1/2z moles per mole of the residual chlorine in the olefin resin to 0.5% by weight based on the olefin resin to give an olefin resin composition, and the mixture of the olefin resin composition is melt-molded with the hydrolyzed ethylene-vinyl acetate copolymer. According to the process, the gel formation can be remarkably reduced, the long run processability can be remarkably increased, and the molded articles having excellent qualities can be obtained.

5 Claims, No Drawings

PROCESS FOR PRODUCING MOLDED ARTICLE COMPRISING HYDROTALCITE, EVOH, AND OLEFIN RESIN

BACKGROUND OF THE INVENTION

The present invention relates to a process for producing a molded article comprising a mixture of an olefin resin and hydrolyzed ethylene-vinyl acetate copolymer, wherein the long run processability during the melt-molding (hereinafter referred to as "long run processability") and qualities of molded articles can be remarkably improved.

Various molded articles can be obtained by melt-molding a mixture of an olefin resin such as polyethylene or polypropylene, and hydrolyzed ethylene-vinyl acetate copolymer (hereinafter referred to as "EVOH"). Objects of the above-mentioned technique are as follows:

(1) To obtain physical properties, which cannot be expected from employing only one of the said resin, as described in, for instance, Japanese Examined Patent Publication (Tokkyo Kokoku) No. 1032/1967 and No. 44579/1974, Japanese Unexamined Patent Publication (Tokkyo Kokai) No. 7038/1973, No. 65544/1975 and No. 122950/1983, and the like.

(2) To reuse useless portions of molded articles, that is, scraps or cut edges of the molded articles which are obtained during the production of laminated moldings of the olefin resin and the EVOH, or inferior goods.

From the view point of the industrial practice, the object of item (2) is more important.

However, when the molded articles such as laminated films or sheets are produced by means of the melt-molding with the above-mentioned mixture of resins, a gelled resin, a colored or carbonized resin during thermal degradation happens to adhere to an inner wall of an extruder during the molding. And after all, there is occurred a problem that the melt-molding cannot be continuously carried out for a long period of time, that is to say, so-called long run processability becomes poor. Also, a gelled material is often incorporated into the molded article during the melt-molding, which results in the quality deterioration such as occurrence of fish eyes during the film-molding.

To solve the above-mentioned problems is particulary important when reusing waste products of laminated moldings (scraps or cut edges of laminated moldings, inferior goods and so on) from the olefin resin and the EVOH.

In fact, recently, it is unusual that each of the olefin resin and the EVOH is employed singly for producing films, sheets, containers or bottles for wrapping or packaging. That is to say, it is usual that they are employed as the laminated molding, the molding constitutes of two, three or more layers and sometimes there are adhesive layers between the layers, if necessary. Because in the market the wrapping or packaging materials are required to have more super properties. However, when the laminated moldings are produced, a lot of scraps or cut edges of the laminated moldings or inferior goods and so on are generated. Accordingly, the recycling of the waste products of laminated moldings is strongly required in the industry.

Of course, the lack of long run processability becomes problem very rarely even when the EVOH or the olefin resin is used singly, but it becomes more serious in case of using a mixture of the EVOH and the olefin resin. In the melt-molding, screen meshes are often choked with the gelled materials, or melted resins adhere to a screw in an extruder frequently. As a result, there is required remarkably troublesome operation, that is, disassembly of extruder and the cleaning of screen meshes or the screw at every time when screen meshes are choked or the melted resins adhere to a screw.

Recently, for solving the above matter, Japan Tokkyo Kokai No. 199040/1985 has suggested a process in which a salt or an oxide including at least one element selected from the group consisting of elements of groups (I), (II) and (III) in the periodic table is added to the mixture of the olefin resin and the EVOH. According to the description of the Tokkyo Kokai, it is recommened that the above-mentioned salt or oxide is added to the EVOH, the mixture is thoroughly kneaded, the olefin resin is added to the kneaded mixture, and then the mixture is melt-molded. However, the satisfactory effects cannot be obtained from the above-mentioned process, for instance, as to the improvement of the long run processability, the melt-molding can be continuously carried out for about 48 hours at most. It goes without saying that, the longer the melt-molding can be carried out continuously, the more advantageously it can be done industrially.

An object of the present invention is to provide a process for producing a molded article, wherein the long run processability and qualities of molded articles can be remarkably improved This and other objects of the present invention will become apparant from the description thereof

SUMMARY OF THE INVENTION

In accordance with the present invention, there is provided the process for producing molded article, as follows. In a process for producing a molded article comprising a mixture of an olefin resin which includes a residual chlorine due to a Ziegler type catalyst, a hydrolyzed ethylene-vinyl acetate copolymer, and a hydrotalcite compound having the formula:

$$M_xAl_y(OH)_{2x+3y-2z}(E)_z \cdot aH_2O \qquad (I)$$

(wherein "M" is Mg, Ca or Zn, "E" is $CO_3$ or $HPO_4$, "x", "y" and "z" are positive numbers and "a" is 0 or a positive number); the improvement wherein the hydrotalcite compound is previously melt-mixed into the olefin resin in a proportion of $1/2z$ moles per mole of the residual chlorine in the olefin resin to 0.5% by weight based on the olefin resin to give an olefin resin composition, and the mixture of the olefin resin composition and the hydrolyzed ethlene-vinyl acetate copolymer is melt-molded. In a process of the present invention, the obtained molded articles have extremely excellent qualities, because of the superior long run processability and the improved preventation against the gelation In the above-mentioned process, when a metallic salt of higher fatty acid having 10 to 20 carbon atoms exists in that mixture, the adhesion property of the mixture to a metal portion in an extruder is lowered And accordingly, more excellent long run processability can be expected than the use of only hydrotalcite compound.

DETAILED DESCRIPTION

The gel formation in melt-molding the mixture of the olefin resin and the EVOH can be prevented only when the specific amount of the hydrotalcite compounds having the formula (I):

$$M_xAl_y(OH)_{2x+3y-2z}(E)_z \cdot aH_2O \quad (I)$$

(wherein "M" is Mg, Ca or Zn, "E" is $CO_3$ or $HPO_4$, "x", "y" and "z" are positive numbers, and "a" is 0 or a positive number) is previously melt-mixed into the olefin resin.

A mixing ratio of the EVOH and the olefin resin is not particularly limited. However, the effect of the present invention can be extremely obtained in case of using the mixture having the ratio that EVOH is 0.1 to 40% by weight based on the olefin resin, preferably 0.5 to 20% by weight. Because the mixture remarkably gels when its composition is within the above-mentioned mixing ratio.

The olefin resin used in the invention is prepared by employing a Ziegler type catalyst, accordingly it includes chlorine element due to the catalyst. The content of chlorine in the olefin resin is from 1 to 300 ppm, preferably from 3 to 150 ppm.

As the olefin resin used in the invention, there are employable, for instance, a high density, intermediate density, low density or linear-low density olefin homopolymer such as polyethylene, polypropylene, polybutene or polypentene; ethylene-propylene copolymer; a copolymer of ethylene or propylene as a main component and an α-olefin having about 2 to about 20 carbon atoms such as 1-butene or 1-hexene; an olefin-vinyl acetate copolymer containing not less than 90% by mole of olefin such as ethylene or propylene; an olefin-acrylic ester copolymer; an olefin-methacrylic ester copolymer; a copolymer of the above-mentioned homopolymer or copolymer graft-modified with unsaturated carboxylic acid, and the like. The above-mentioned olefin resin can be employed alone or in admixture thereof. Among them, polyethylene having a melt index of 0.1 to 15 at 210° C. or polypropylene having a melt index of 0.2 to 12 at 210° C. is apt to cause gelation and accordingly, the effect of the invention is particularly expected in employing the above-mentioned polyethylene or polypropylene.

The most distinctive feature of the present invention is that the specific amount of the hydrotalcite compound having the formula (I):

$$M_xAl_y(OH)_{2x+3y-2z}(E)_z \cdot aH_2O \quad (I)$$

(wherein "M" is Mg, Ca or Zn, "E" is $CO_3$ or $HPO_4$, "x", "y" and "z" are positive numbers, and "a" is 0 or a positive number) is previously melt-mixed into the olefin resin. Examples of the hydrotalcite compound are, for instance,
$Mg_{4.5}Al_2(OH)_{13}CO_3 \cdot 3.5H_2O$,
$Mg_5Al_2(OH)_{14}CO_3 \cdot 4H_2O$,
$Mg_6Al_2(OH)_{16}CO_3 \cdot 4H_2O$,
$Mg_8Al_2(OH)_{20}CO_3 \cdot 5H_2O$,
$Mg_{10}Al_2(OH)_{22}(CO_3)_2 \cdot 4H_2O$,
$Mg_6Al_2(OH)_{16}HPO_4 \cdot H_2O$,
$Ca_6Al_2(OH)_{16}CO_3 \cdot 4H_2O$,
$Zn_6Al_6(OH)_{16}CO_3 \cdot 4H_2O$, and the like.
The same effect as the above-mentioned hydrotalcite compound can be also expected from a compound in which OH-groups in the formula: $Mg_2Al(OH)_9 \cdot 3H_2O$ are partly substituted with $CO_3$ or $HPO_4$, which cannot be clearly indicated by a chemical formula, or the hydrotalcite compound from which water of crystallization is removed ("a"=0). Especially, a compound that "M" is Mg and "E" is $CO_3$ in the formula (I) can show an excellent effect.

The proportion of the hydrotalcite compound is required to be not less than 1/2z moles per mole of the residual chlorine in the olefin resin. The term "not less than 1/2z moles" means that the hydrotalcite compound must be not less than an equivalent to the residual chlorine. Because an excellent effect of this invention is achieved in accordance with the mechanism that a hydrotalcite compound catches a residual chlorine. The chlorine and the hydrotalcite compound are reacted, for instance, as follows:

$$Mg_{4.5}Al_2(OH)_{13}CO_3 \cdot 3.5H_2O + 2HCl$$
$$\rightarrow Mg_{4.5}Al_2(OH)_{13}Cl_2 \cdot 3.5H_2O + H_2O + CO_2$$

In the chemical reaction formula, two moles of chlorines are substituted for one mole of the carbonate radical. Accordingly, when the amount of the hydrotalcite compound is more than 1/2z moles, the residual chlorine is thoroughly substituted for the E group in the formula (I).

That is to say, the feature of the invention is to carry out the melt-molding in the absence from residual chlorine in the mixture of EVOH and the olefin resin.

If the amount of the hydrotalcite compound is less than the equivalent, in other words, even if the residual chlorine remains slightly in the olefin resin, the effect of the invention is hard to obtain. That is, the long run processability lowers and the qualities of the molded article remarkably lowers due to the occurrence of gelation, and the like.

An upper limit proportion of the hydrotalcite compound is 0.5% by weight based on the olefin resin, preferably 0.3% by weight. When the proportion of the hydrotalcite compound is more than 0.5% by weight, physical properties, particularly transparency, flexibility and impact-resistance remarkably lower.

Another distinctive feature of the present invention is that the EVOH is mixed into the said olefin mixture which is thoroughly kneaded by above-mentioned method. If the hydrotalcite compound is previously melt-mixed into the EVOH and then the olefin resin is melt-mixed therewith, or if the olefin resin, the EVOH and the hydrotalcite compound are melt-mixed at the same time, the effect of the invention cannot be expected.

As to the mixing method carried out in the invention, any method is applicable. To be concrete, for instance, one method is, first the olefin resin and the hydrotalcite compound are mixed by a Henschel mixer, a tumbler, or the like, then the mixture is melt-kneaded by an extruder to prepare pellets, than they are melt-molded with pellets or powders of the EVOH; another method is to again melt-mold the laminated moldings containing the EVOH, the olefin and the hydrotalcite compound, especially, laminated moldings whose components comprised at least two layers consisting of the layer of the mixture of olefin and hydrotalcite and the layer of the EVOH. Generally, the latter, that is to say scraps, cut edges or inferior goods and so on obtained during the molding of the above-mentioned laminated moldings are used. The crushed articles are usually called "regrind". They are melt-molded after the conversion. Of course, the above-mentioned regrind can be used as a part of the olefin resin.

An example of EVOH used in the invention is, for instance, EVOH having an ethylene content of 20 to 80% by mole, preferably 25 to 70% by mole, and a degree of hydrolysis in vinyl acetate units of at least 90% by mole, preferably at least 97% by mole. When the ethylene content is less than 20% by mole, the heat stability and viscosity-stability in the melt-molding lower. On the other hand, when the ethylene content is more than 80% by mole, the oxygen barrier property lowers.

When the EVOH has the degree of hydrolysis in vinyl acetate units of less than 90% by mole, it is unpractical since physical properties such as heat stability, oxygen barrier property, oil resistance and water resistance and so on are much poorer.

The EVOH used in the invention may include a third component in a little amount i.e., less than about 40% by mole besides ethylene and vinyl acetate (or hydrolyzed vinyl acetate). Examples of the monomer are, for instance, unsaturated carboxylic acids, and esters or salts thereof; unsaturated sulfonic acids or salts thereof; acrylamide or methacrylamide; acrylonitrile or methacrylonitrile; α-olefins such as propylene, butene, α-octene and α-octadecene; vinyl esters other than vinyl acetate. A metallic salt of a higher fatty acid metal salt may be used at the same time. Examples of the fatty acids are, for instance, lauric acid, tridecylic acid, myristic acid, pentadecylic acid, palmitic acid, heptadecylic acid, stearic acid, nonadecanoic acid, and the like. Examples of the metallic salts thereof are, for instance, metallic salt of alkali such as sodium salt and potassium salt, metallic salt of alkaline earth such as magnesium salt, calcium salt and barium salt, and furthermore zinc metal salt, and the like. The metallic salt may be employed alone or in admixture thereof. Among them, the metallic salt of stearic acid is remarkably effective.

The amount of the metallic salt of a higher fatty acid is 50 to 10,000 ppm based on the mixture of the EVOH and the olefin resin, preferably 80 to 8,000 ppm. When the amount is less than 50 ppm, the effect of the addition of a metallic salt cannot be obtained, and on the other hand, when the amount is more than 10,000 ppm, not only it is economically disadvantageous to use but physical properties of the molded articles lower since the extrusion-processability is poor. It can be added at any time to be hoped.

In the invention, it is preferable that the melt-molding is carried out at a temperature of about 160° C. to about 260° C. When the mixture of the olefin resin and the EVOH is melt-molded, if necessary, the mixture may suitably include some reinforcements such as a glass fiber and carbon fiber; some lubricants such as a polyethylene having low molecular weight, a polypropylene having low molecular weight, a paraffin, an ethylene-bisamide and an epoxy lubricant; a usual additive such as a filler, a coloring agent, a stabilizer and blowing agent. Also, each of the olefin and EVOH or their mixture may include a suitable amount of modifing thermoplastic resin such as polyamide, polyester, polyvinyl chloride and polyacrylic resin.

In the invention, any molding method is applicable to the molding of the mixture, such as injection molding method, compression molding method and extrusion molding method. Examples of the extrusion molding are, for instance, T-die extrusion method, blow molding method, pipe extrusion method, wire extrusion method, profile die extrusion method, tubular film process, and the like.

The molded articles produced according to the present invention can have any shape such as not only films, sheets, tapes, bottles, pipes, filaments, profiles and other shaped articles but laminated moldings with other resin, and so on.

As a resin to be laminated with the molded article produced according to the invention, high gas barrier resin such as EVOH, a polyamide resin such as nylon 6 or nylon 6,6, or vinylidene chloride resin is often used, since the high gas barrier property is often required to the laminated moldings. The thermoplastic resin other than the above-mentioned resin may be used, for instance, polycarbonate, vinyl chloride resin, acrylic resin, polystyrene, polyvinyl ester, polyester, polyester elastomer, polyurethane elastomer, chlorinated polyethylene, chlorinated polypropylene, polyolefin, and the like are listed. These resins may be uniaxialy or biaxialy oriented.

The laminated moldings can have any layer construction. When A ($A_1$, $A_2$, ... ) is a layer of molded article prepared according to the invention, B ($B_1$, $B_2$ ...) is a layer of high gas barrier resin and C is an adhesive layer, and for instance, when the laminated moldings are films, sheets or bottoles, the construction is structure such as A/B/A, B/A/B, $B_1/B_2$/A, B/$A_1/A_2$, A/B/A/B/A, $A_2/A_1$/B/$A_1/A_2$, A/C/B, A/C/B/C/A, B/C/A/C/B and A/C/B/C/A/C/B/C/A. When the laminated moldings are filaments, the construction might be a bimetal type of A and B, a skin-core type of A and B, an eccentricity type of A and B, and the like. Also, either A or B, or both A and B might be blended with the other resins, or might be blended with a resin giving adhesive to the layers.

The obtained molded articles, coextruded articles or extrusion-coated articles can be, if necessary, subjected with heat-treatment, cold-treatment, rolling, uniaxial or biaxial orientation, printing treatment, dry-laminating treatment, solution or melt coating treatment, bag-making working, deep drawing working, box-making working, tubing working, split working, and the like.

According to the process of the present invention, the problem of the gelation in melt-molding step can be remarkably resolved. Accordingly, the melt-molding can be carried out continuously during a long period without gel formation, thermal decomposition and the adhesion to the screw or the wall in the extruder.

The molded article obtained in accordance with the present invention has excellent qualities, e.g. a film has few fish eyes. Also, the process of the invention is very effective in producing the laminated moldings by utilizing the resin mixture of this invention.

The molded articles produced according to the invention are useful for various uses, e.g. films for wrapping or packaging including film for wrapping or packaging foods, vessels, bottles, trays for foods, sheets, parts of the machine, and the like.

The present invention is more specifically described and explained by means of the following Examples, in which all parts and % are by weight unless otherwise noted. It is to be understood that the present invention is not limited to Examples, and various changes and modifications may be made in the invention without departing from the spirit and scope thereof.

EXAMPLES 1 TO 23

A hydrotalcite compound was added to 100 parts of an olefin resin shown in Table 1 in an amount and a kind shown in Table 1 and the mixture was melt-kneaded at 220° C. to give pellets. There were mixed 100 parts of the obtained pellets and an EVOH shown in Table 1 in an amount shown in Table 1 and the mixture was extruded into a film having a thickness of 30μ under the following conditions.

Molding condition

Extruder: Extruder having a diameter of 40 mm$\phi$
Screw: L/D=25, compression, ratio=3.5
Screen mesh: 60/120/60 meshes
Dye: Fishtail die
Extrusion temperature: Front part of cylinder: 230° C. Die: 210° C.
Rotating speed of screw: 75 rpm Amount of gel in the extruder during the molding, long run processability and quality of film were estimated by the following method.

The results are shown in Table 1.

Testing method (1) Observation of gel

After the extrusion was continuously carried out for 48 hours, the extruder was disassembled. A gelled material adhering to a screen mesh and build-up of decomposed material adhering to a surface of a screw were observed.

(Estimation)
1: A gelled material does not at all adhere to the surface of the screen mesh.
2: A gelled material adheres to slightly
3: A gelled material adheres to noticeably
4: A gelled material adheres to remarkably
5: A gelled material adheres to all over the surface of the screen mesh.
1: A thermal decomposed gel does not at all adhere to the surface of the screw.
2: A thermal decomposed gel adheres to slightly
3: A thermal decomposed gel adheres to noticeably
4: A thermal decomposed gel adheres to remarkably
5: A thermal decomposed gel adheres to all over the surface of the screw.

(2) Long run processability

Occurrence of fluctuation of torque, fluctuation of resin pressure, surging (fluctuation of discharge) or lowering of discharge during a continuous extrusion for 10 days is shown, if observed.

(3) Quality of film

The number of fish eyes having a diameter of at least 0.2 mm observed on area of 100 cm$^2$ of film produced by an extruder after 48 hours of continuous extrusion was counted with a magnifier.

(Estimation)
1: From 0 to 5
2: From 6 to 10
3: From 11 to 50
4: From 51 to 200
5: Not less than 201

TABLE 1

| | EVOH Kind | EVOH Amount (part) | Olefin resin Kind | Hydrotalcite compound Kind | Hydrotalcite Amount based on the olefin resin (ppm) | Hydrotalcite Amount per mole of the residual chlorine (mole) | Amount of gel Screen | Amount of gel Screw | Long run processability | Fish eyes |
|---|---|---|---|---|---|---|---|---|---|---|
| Ex. 1 | (A-1)*1 | 2 | (B-1)*3 | $Mg_{4.5}Al_2(OH)_{13}CO_3.3.5H_2O$ | 500 | 0.70 | 1 | 2 | No fluctuation | 1 |
| Ex. 2 | " | 2 | " | " | 2,000 | 2.80 | 1 | 2 | No fluctuation | 1 |
| Ex. 3 | " | 2 | " | " | 700 | 0.98 | 1 | 2 | No fluctuation | 1 |
| Ex. 4 | " | 10 | " | " | 1,000 | 1.40 | 1 | 2 | No fluctuation | 1 |
| Ex. 5 | " | 25 | " | " | 500 | 0.70 | 1 to 2 | 2 | No fluctuation | 1 |
| Ex. 6 | " | 25 | " | " | 1,500 | 2.10 | 1 to 2 | 2 | No fluctuation | 1 |
| Ex. 7 | " | 5 | " | $Mg_6Al_2(OH)_{16}CO_3.4H_2O$ | 700 | 0.59 | 1 to 2 | 2 | No fluctuation | 1 |
| Ex. 8 | " | 25 | " | $Ca_6Al_2(OH)_{16}CO_3.4H_2O$ | 800 | 0.71 | 2 to 3 | 3 | A little fluctuation of torque after 60 hours | 2 |
| Ex. 9 | " | 2 | " | $Zn_6Al_2(OH)_{16}CO_3.4H_2O$ | 500 | 0.67 | 2 to 3 | 3 | A little fluctuation of torque after 72 hours | 2 |
| Ex. 10 | " | 2 | " | $Mg_{4.5}Al_2(OH)_{13}HPO_4.3.5H_2O$ | 500 | 0.66 | 2 | 2 | A little fluctuation of torque after 60 hours | 2 |
| Ex. 11 | " | 2 | (B-2)*4 | $Mg_{4.5}Al_2(OH)_{13}CO_3.3.5H_2O$ | 1,000 | 0.67 | 1 | 2 | No fluctuation | 1 |
| Ex. 12 | " | 2 | " | $Ca_6Al_2(OH)_{16}CO_3.4H_2O$ | 1,500 | 0.73 | 2 | 3 | A little fluctuation of resin pressure after 60 hours | 2 |
| Ex. 13 | (A-1) | 2 | (B-2) | $Zn_6Al_2(OH)_{16}CO_3.4H_2O$ | 1,500 | 0.59 | 2 to 3 | 3 | A little fluctuation of | 1 |

TABLE 1-continued

| | EVOH Kind | EVOH Amount (part) | Olefin resin Kind | Hydrotalcite compound Kind | Amount based on the olefin resin (ppm) | Amount per mole of the residual chlorine (mole) | Amount of gel Screen | Amount of gel Screw | Long run processability | Fish eyes |
|---|---|---|---|---|---|---|---|---|---|---|
| Ex. 14 | " | 2 | (B-3)*5 | $Mg_{4.5}Al_2(OH)_{13}CO_3.3.5H_2O$ | 300 | 2.01 | 1 | 2 | resin pressure after 48 hours No fluctuation | 1 |
| Ex. 15 | " | 5 | " | $Mg_6Al_2(OH)_{16}CO_3.4H_2O$ | 300 | 1.76 | 1 to 2 | 3 | A little fluctuation of torque after 72 hours | 1 |
| Ex. 16 | " | 2 | (B-4)*6 | $Mg_{4.5}Al_2(OH)_{13}CO_3.3.5H_2O$ | 300 | 0.70 | 1 | 2 | No fluctuation | 1 |
| Ex. 17 | " | 5 | " | $Mg_6Al_2(OH)_{16}CO_3.4H_2O$ | 300 | 0.59 | 1 to 2 | 2 | A little fluctuation of pressure after 84 hours | 1 |
| Ex. 18 | (A-2)*2 | 2 | (B-1) | $Mg_{4.5}Al_2(OH)_{13}CO_3.3.5H_2O$ | 500 | 0.70 | 1 | 2 | No fluctuation | 1 |
| Ex. 19 | " | 2 | " | $Ca_6Al_2(OH)_{16}CO_3.4H_2O$ | 700 | 0.71 | 2 to 3 | 3 | A little fluctuation of torque after 60 hours | 2 |
| Ex. 20 | " | 2 | " | $Zn_6Al_2(OH)_{16}CO_3.4H_2O$ | 800 | 0.67 | 2 to 3 | 3 | A little fluctuation of torque after 48 hours | 2 |
| Ex. 21 | " | 5 | " | $Mg_{4.5}Al_2(OH)_{13}HPO_4.3.5H_2O$ | 500 | 0.66 | 1 | 3 | A little fluctuation of discharge after 60 hours | 1 |
| Ex. 22 | " | 2 | (B-2) | $Mg_{4.5}Al_2(OH)_{13}CO_3.3.5H_2O$ | 1,000 | 0.67 | 1 | 2 | No fluctuation | 1 |
| Ex. 23 | " | 5 | " | $Mg_6Al_2(OH)_{16}CO_3.4H_2O$ | 1,000 | 0.56 | 1 to 2 | 2 | A little fluctuation of torque after 84 hours | 2 |

Note:
EVOH
(A-1)*1: Ethylene content: 31% by mole Degree of hydrolysis in vinyl acetate units: 99.1% by mole Melt index at 210° C.: 4.0
(A-2)*2: Ethylene content: 40% by mole Degree of hydrolysis in vinyl acetate units: 99.3% by mole Melt index at 210° C.: 7.5
Olefin resin
(B-1)*3: Polypropylene: Melt index at 210° C.: 1.0 Specific gravity: 0.890 Chlorine content: 50 ppm
(B-2)*4: Polypropylene: Melt index at 210° C.: 0.9 Specific gravity: 0.905 Chlorine content: 105 ppm
(B-3)*5: High density polyethylene (HDPE): Melt index at 210° C.: 6.5 Density: 0.968 Chlorine content: 10 ppm
(B-4)*6: Linear low density polyethylene (LLDPE): Melt index at 210° C.: 1.0 Density: 0.922 Chlorine content: 30 ppm

COMPARATIVE EXAMPLE 1

The procedure of Example 1 was repeated except that the hydrotalcite compound was not added to the olefin resin to give a film.

The results are shown in Table 2.

COMPARATIVE EXAMPLE 2

The procedure of Example 1 was repeated except that the EVOH was previously melt-kneaded with the hydrotalcite compound to give pellets, and to which an olefin resin was added to give a film.

The results are shown in Table 2.

COMPARATIVE EXAMPLE 3

The procedure of Example 1 was repeated except that the EVOH, the hydrotalcite compound and the olefin resin were mixed at the same time to give a film.

The results are shown in Table 2.

COMPARATIVE EXAMPLE 4

The procedure of Example 1 was repeated except that an amount of a hydrotalcite compound was less than equivalent (0.1 mole) to a residual chlorine in the olefin resin to give a film.

The results are shown in Table 2.

TABLE 2

| | EVOH Kind | EVOH Amount (part) | Olefin resin Kind | Hydrotalcite compound Kind | Amount based on the olefin resin (ppm) | Amount per mole of the residual chlorine (mole) | Amount of gel Screen | Amount of gel Screw | Long run processability | Fish eyes |
|---|---|---|---|---|---|---|---|---|---|---|
| Com. Ex. 1 | (A-1) | 2 | (B-2) | — | 0 | 0 | 5 | 5 | Occurrence of fluctuation of torque and resin pressure, and surg- | 5 |

TABLE 2-continued

| | EVOH | | Olefin resin Kind | Hydrotalcite compound | | | Amount of gel | | Long run processability | Fish eyes |
|---|---|---|---|---|---|---|---|---|---|---|
| | Kind | Amount (part) | | Kind | Amount based on the olefin resin (ppm) | Amount per mole of the residual chlorine (mole) | Screen | Screw | | |
| Com. Ex. 2. | " | 25 | " | $Mg_{4.5}Al_2(OH)_{13}CO_3.3.5H_2O$ | 500 | 0.70 | 4 | 4 | ing after 12 hours fluctuation of torque after 50 hours | 4 |
| Com. Ex. 3 | " | 2 | " | " | 500 | 0.70 | 4 to 5 | 4 to 5 | fluctuation of torque after 18 hours | 4 |
| Com. Ex. 4 | " | 2 | " | " | 35 | 0.10 | 5 | 5 | fluctuation of torque after 12 hours | 5 |

EXAMPLES 24 TO 30

The procedure of Example 1 (Example 24 to 26), Example 5 (Example 27), Example 12 (Example 28), Example 16 (Example 29) or Example 13 (Example 30) was repeated except that a metallic salt of higher fatty acid shown in Table 3 was added with the hydrotalcite compound in an amount of 500 ppm based on a total amount of the EVOH and the olefin resin to give a film.

The results are shown in Table 3.

TABLE 3

| Ex. No. | Ex. No. of preceding Example based on | Metallic salt of higher fatty acid | Occurrence of gelation | | Long run processability |
|---|---|---|---|---|---|
| | | | Screen | Screw | |
| Ex. 24 | Example 1 | $(C_{17}H_{35}COO)_2Ca$ | 1 | 1 | No fluctuation |
| Ex. 25 | " | $(C_{11}H_{23}COO)_2Ca$ | 1 | 1 | " |
| Ex. 26 | " | $(C_{11}H_{23}COO)_2Mg$ | 1 | 1 | " |
| Ex. 27 | Example 5 | $(C_{17}H_{35}COO)_2Ca$ | 1 | 1 | " |
| Ex. 28 | Example 12 | $(C_{17}H_{35}COO)_2Mg$ | 1 | 1 | " |
| Ex. 29 | Example 16 | $(C_{17}H_{35}COO)_2Ca$ | 1 | 1 | " |
| Ex. 30 | Example 23 | $(C_{17}H_{35}COO)_2Zn$ | 2 | 1 | " |

As is apparent from Table 3, long run processability is further increased in comparison with that in the process in which the metallic salt of higher fatty acid was not added, and the occurrence of gelation and quality of film were as excellent as or more excellent than those in process in which the metallic salt of higher fatty acid was not added.

EXAMPLES 31 TO 35

A laminated film having three layers, that is, having an inner layer of EVOH (A-1) (thickness: 5μ, an outer layer of olefin resin (B-1) (thickness: 80μ) and a middle layer of a modified polyethylene prepared by graft-polymerizing 10% by weight of maelic anhydride with polyethylene as an adhesive layer (thickness: 5 μ, melting index at 210° C.: 2.0) was prepared under the following conditions.

In the above-mentioned process, the polypropylene as a raw material was previously melt-mixed with 800 ppm of the hydrotalcite compound shown in Table 4.

Molding conditions

Extruder: Extruder having a diameter of 30 mm (for inner layer and middle layer), Extruder having a diameter of 65 mm (for outer layer)
Screw: L/D=28, compression ratio=3.2
Dye: Spiral three layer blown film die, Die width: 300 mm
Extrusion temperature: Cylinder temperature at front position: 190° C. (for inner layer), 210° C. (for middle layer), 220° C. (for outer layer), Die temperature: 2110° C.
Rotating speed of screw: 30 rpm (for inner layer and middle layer), 100 rpm (for outer layer)

The cut edges and scrapes of the obtained laminated film made during the molding were crushed to give a regrind having a particle size of about 1 to about 5 mm.

The regrind consisted of EVOH (A-1), the modified polyethylene as an adhesive and olefin resin (B-1) in a ratio of 8/7/100 by average weight.

Using this regrind as an outer layer, the regrind and the EVOH (A-1; inner layer) were coextruded to give a laminated film under the same condition as above.

The results are shown in Table 4.

On the other hand, the above-mentioned procedure of Example 31 to 35 was repeated except that calcium stearate (($C_{17}H_{35}COO)_2Ca$) was added in an amount of 800 ppm based on a total amount of the EVOH (A-1) and the olefin resin (B-1) with the hydrotalcite compound to give a compound to give a laminated film. The amount of gel and quality of film were as excellent as those in Example 31 and long run processability was improved as excellent as that in Example 24.

EXAMPLES 36 TO 39

The procedure of Example 31 was repeated except that the olefin resin (B-2) was employed instead of the olefin resin (B-1) as an outer layer and the extrusion was carried out under the following conditions to give a laminated film.

Molding conditions

Extruder: The same extruder as in Example 31
Screw: The same screw as in Example 31
Die: The same die as in Example 31
Extrusion temperature: Cylinder temperature at front position: 190° C. (for inner layer), 210° C. (for middle layer), 220° C. (for outer layer), Die temperature: 2110° C.
Rotating speed of screw: The same speed as in Example 31

Using a hydrotalcite compound shown in Table 4, the regrind (outer layer) and the EVOH (A-1; inner layer) were coextruded to give a laminated film in the same manner as in Example 31.
The results are shown in Table 4.

COMPARATIVE EXAMPLE 5

The procedure of Example 31 was repeated except that the hydrotalcite compound was not added to give a laminated film.
The results are shown in Table 4.

(wherein "M" is Mg, Ca or Zn, "E" is $CO_3$ or $HPO_4$, "x", "y" and "z" are positive numbers and "a" is 0 or a positive number); the improvement wherein the hydrotalcite compound is previously melt-mixed into the olefin resin in a proportion of $1/2z$ moles per mole of the residual chlorine in the olefin resin to 0.5% by weight based on the olefin resin to give an olefin resin composition, and the mixture of the olefin resin composition and the hydrolyzed ethlene-vinyl acetate copolymer is melt-molded.

2. The process of claim 1, wherein an upper limit of said proportion is 0.3% by weight.

3. The process of claim 1, wherein said hydrotalcite compound includes a metallic salt of higher fatty acid.

4. The process of claim 1, wherein a regrind of a laminated molding comprising the olefin resin composition and the hydrolyzed ethylene-vinyl acetate copolymer is used as a material of the molded article.

5. The process of claim 4, wherein a laminated molding having at least one layer of a mixture of (1) the regrind of the laminated molding of the olefin resin composition and the hydrolyzed ethylene-vinyl acetate copolymer, and (2) a polyolefin is melt-molded.

TABLE 4

| Ex. No. | Laminated film Inner layer | Laminated film Outer layer | Hydrotalcite compound | Occurrence of gelation Screen | Occurrence of gelation Screw | Long run processability | Fish eyes |
|---|---|---|---|---|---|---|---|
| Ex. 31 | (A-1) | Regrind of (B-1) as a main component | $Mg_{4.5}Al_2(OH)_{13}.3.5H_2O$ | 1 | 2 | No fluctuation | 1 |
| Ex. 32 | " | Regrind of (B-1) as a main component | $Mg_6Al_2(OH)_{16}CO_3.4H_2O$ | 1 | 2 | " | 1 |
| Ex. 33 | " | Regrind of (B-1) as a main component | $Mg_{10}Al_2(OH)_{22}(CO_3)_2.4H_2O$ | 1 | 2 | " | 1 |
| Ex. 34 | " | Regrind of (B-1) as a main component | $Ca_6Al_2(OH)_{16}CO_3.4H_2O$ | 1 to 2 | 2 to 3 | A little fluctuation of torque after 72 hours | 2 |
| Ex. 35 | " | Regrind of (B-1) as a main component | $Zn_6Al_2(OH)_{16}CO_3.4H_2O$ | 2 | 2 | Change of resin pressure after 48 hours | 2 |
| Ex. 36 | " | Regrind of (B-2) as a main component | $Mg_{4.5}Al_2(OH)_{13}CO_3.3.5H_2O$ | 1 | 2 | No fluctuation | 1 |
| Ex. 37 | " | Regrind of (B-2) as a main component | $Mg_{10}Al_2(OH)_{22}(CO_3)_2.4H_2O$ | 1 | 2 | " | 1 |
| Ex. 38 | " | Regrind of (B-2) as a main component | $Ca_6Al_2(OH)_{16}CO_3.4H_2O$ | 1 to 2 | 2 | A little fluctuation of torque after 72 hours | 2 |
| Ex. 39 | " | Regrind of (B-1) as a main component | $Zn_6Al_2(OH)_{16}CO_3.4H_2O$ | 1 to 2 | 2 | A little fluctuation of torque after 72 hours | 2 |
| Com. Ex. 5 | " | Regrind of (B-1) as a main component | — | 5 | 4 | Occurrence of surging and lowering of discharge after 8 hours | 5 |

What we claim is:

1. In a process for producing a molded article comprising a mixture of an olefin resin which includes a residual chlorine due to a Ziegler type catalyst, a hydrolyzed ethylene-vinyl acetate copolymer, and a hydrotalcite compound having the formula:

$$M_xAl_y(OH)_{2x+3y-2z}(E)_z \cdot aH_2O \quad (I)$$